(12) United States Patent
Hagemann et al.

(10) Patent No.: US 7,287,369 B2
(45) Date of Patent: Oct. 30, 2007

(54) METHOD FOR EXTENDING A NOZZLE AND EXTENDED NOZZLE FOR ROCKET DRIVES

(75) Inventors: Gerald Hagemann, Hoehenkirchen/Siegertsbrunn (DE); Michael Terhardt, Karlsfeld (DE)

(73) Assignee: EADS Space Transportation GmbH, Munich (DE)

( * ) Notice: Subject to any disclaimer, the term of this patent is extended or adjusted under 35 U.S.C. 154(b) by 666 days.

(21) Appl. No.: 10/477,701

(22) PCT Filed: May 3, 2002

(86) PCT No.: PCT/EP02/04842

§ 371 (c)(1),
(2), (4) Date: Jun. 25, 2004

(87) PCT Pub. No.: WO02/092988

PCT Pub. Date: Nov. 21, 2002

(65) Prior Publication Data

US 2004/0231316 A1    Nov. 25, 2004

(30) Foreign Application Priority Data

May 15, 2001 (DE) ............... 101 23 731

(51) Int. Cl.
*F02K 1/09* (2006.01)
(52) U.S. Cl. .............. 60/204; 60/771; 239/265.33
(58) Field of Classification Search .......... 60/204, 60/770, 771; 239/265.11, 265.19, 265.33
See application file for complete search history.

(56) References Cited

U.S. PATENT DOCUMENTS

| | | | |
|---|---|---|---|
| 3,394,549 A | 7/1968 | Sutor | 60/271 |
| 4,383,407 A | 5/1983 | Inman | 60/271 |
| 4,387,564 A | 6/1983 | Carey | 60/242 |
| 4,489,889 A * | 12/1984 | Inman | 239/265.33 |
| 4,947,644 A | 8/1990 | Hermant | 60/257 |
| 5,282,576 A * | 2/1994 | Chatenet et al. | 239/265.33 |
| 6,418,710 B1 * | 7/2002 | Perrier et al. | 60/771 |

FOREIGN PATENT DOCUMENTS

WO    WO97/29277    8/1997

OTHER PUBLICATIONS

G. Hagemann et al., "Advanced Rocket Nozzles", *J. of Propulsion and Power*, 14(5), Sep.-Oct. 1998, pp. 620-634.
J. Beck et al., "Altitude Compensating Nozzles", Rockwell Threshold, Summer 1995, pp. 38-44.
R. Schmucker, "Side loads and their reduction in liquid rocket engines", Report TB-14, 24th Int'l Astronautical Congress, Baku, USSR, Oct. 7-13, 1973.

* cited by examiner

*Primary Examiner*—L. J. Casaregola
(74) *Attorney, Agent, or Firm*—Crowell & Moring LLP.

(57) ABSTRACT

A method for extending a nozzle for a rocket engine is described, in which at least one second region of the contour of the nozzle is arranged as an extension of a first region of the contour of the nozzle. This extension of the first region by the second region occurs at an altitude at which the contour of the open jet of the rocket engine substantially corresponds to the contour of the second region. Also described is a corresponding extendible nozzle for a rocket engine.

6 Claims, 2 Drawing Sheets

METHOD FOR EXTENDING A NOZZLE AND EXTENDED NOZZLE FOR ROCKET DRIVES

This application claims the benefit of priority of German patent document number 101 23 731.6, filed May 15, 2001, the disclosure of which is expressly incorporated by reference herein.

BACKGROUND AND SUMMARY OF THE INVENTION

The present invention relates to a method for extending a nozzle for a rocket engine and to an extendible nozzle for a rocket engine.

Rocket engines used today typically have nozzles with a continuous nozzle contour, so-called bell nozzles. The power of these engines, however, during the ascent of the corresponding missile or spacecraft, is limited at higher altitudes because of the defined nozzle contour. An ideal "altitude compensating" nozzle would adapt the area ratio and thus the nozzle contour to the corresponding altitude during the ascent in such a way that the average nozzle pressure in the exit nozzle at the nozzle end would always match the ambient pressure ("compensated" nozzle). The average nozzle pressure used for this purpose is obtained by one-dimensional or two-dimensional averaging of the pressure across the nozzle cross-section of the propellants ejected through the nozzle. This would result in a full-flow nozzle with a continuously optimal specific pulse during the ascent. For technical reasons, however, it has not thus far been possible to realize this.

Based on their fixed nozzle geometry, conventional engines achieve their optimal power only at a certain point of the flight trajectory. Below that point, the nozzle flow is overexpanded (at low altitude the ambient pressure is greater than the average pressure at the end of the nozzle of the propellants ejected through the nozzle). Above the optimal point, the flow is underexpanded (the ambient pressure is lower than the average pressure at the end of the nozzle of the propellants ejected through the nozzle). After leaving the nozzle, the propellants ejected from the nozzle form a so-called open jet, which depending on the pressure ratios can be constricted or expanded compared to the nozzle end cross section. This is also illustrated in FIGS. 1 and 2. For this reason, engines equipped with such nozzles require a compromise between the engine output at sea level and the engine output at higher altitudes to maximize the payload for a given mission, particularly in the vacuum of space in the case of spacecraft engines. These problems are discussed, for example, in U.S. Pat. No. 3,394,549 and in J. E. Beck and M. D. Horn, "Altitude Compensating Nozzles," Rockwell Threshold, Summer 1995, pp. 38 to 44.

The engine output is further limited by the requirement of a full-flow nozzle at sea level to prevent side loads (lateral force effects) on the nozzle contour. In conventional bell nozzles these lateral forces occur whenever the flow near the wall of the propellants ejected by the nozzle is separated from the nozzle contour starting from the nozzle end because the ambient pressure is too high and air from the environment flows into the nozzle. Because of the turbulent and thus unsteady behavior of the flow field in this region, lateral forces occur despite a perfectly axisymmetric configuration of the nozzle contour, of the inflow within the nozzle of the propellants to be ejected through the nozzle and of the environmental conditions. Additional lateral forces are caused if the conditions do not meet the ideal axisymmetric case. To prevent these side-loads on the ground and during the first phase of the ascent of the missile or spacecraft, all the existing engines require a so-called full-flow nozzle on the ground. The wall pressure at the end of the nozzle must be sufficiently high to prevent the flow from separating from the nozzle contour. As a result, however, the maximum allowable area ratio and thus the engine output at higher altitudes, particularly in a vacuum if the rocket engine is used for a spacecraft, are limited.

The vacuum power of first-stage engines with bell nozzles can be increased by using nozzles with controlled flow separation, which makes it possible to realize a greater area ratio. A concept for "altitude compensation" of the nozzles is realizable through controlled flow separation in the nozzle. The side loads and the thrust loss can be reduced through overexpansion at low altitudes during the first part of the flight trajectory.

These concepts use different techniques for generating as symmetrical a flow separation as possible. Such methods include, for example, the active axisymmetric injection of secondary gases or the passive axisymmetric ventilation of the nozzle with ambient air. The flow can also be actively caused to separate by mounting additional components, such as tripwires, ablating inserts or a diffuser at the nozzle exit, which is discarded during the flight. Such proposals are described, for example, in R. H. Schmucker, "Side loads and their reduction in liquid rocket engines," Report TB-14, 24th International Astronautical Congress, Baku, USSR. Oct. 7 to 13, 1973.

Other prior art concepts achieve a flow-controlling separation purely through the contour design with an invariable structure of the nozzle contour without any movable parts. This includes the so-called dual bell nozzle concept as well as a polygonal nozzle concept.

In the dual bell nozzle, a controlled separation is achieved through a discontinuous nozzle contour, i.e., a sharp bend in the contour. Such nozzles are disclosed, for example, in the initially cited U.S. Pat. No. 3,394,549 and in J. E. Beck and M. D. Horn, "Altitude Compensating Nozzles," Rockwell Threshold, Summer 1995, pp. 38 to 44. Here, the nozzle has a first region with a first contour and a second region with a second contour adjoining the first. During the ascent of the booster rocket, the sharp bend in the contour produces two different states of the flow of the propellants ejected through the nozzle. In the ground mode (low altitude and high ambient pressure) the flow is in contact with the nozzle contour only in the first region. The flow symmetrically separates at the sharp bend in the contour (i.e., at the end of the first region) and completely separates downstream thereof (i.e., in the second region). In other words, an open jet forms in the second region. The controlled and symmetrical flow separation at the sharp bend of the contour reduces the side loads at low altitudes. As the missile or the spacecraft ascends, the decreasing ambient pressure drops below a critical value at a certain altitude, and the flow is in contact with the wall in the second region as well. As a result, starting from this altitude, the flow is in full contact with the nozzle contour throughout the entire nozzle.

The concept of the polygonal nozzle is described, for example, in WO 97/29277. In this concept, starting from a certain area ratio, a contour with a polygonal cross-sectional area (approximately 5 to 7 edges) is used. This is intended flow-dynamically to decouple the individual segments through the different expansion of the propellant gases from the corners to the edge centers in order to reduce the wall pressure correlations in circumferential direction and the aerodynamic side loads. It is further intended to reduce the susceptibility to aeroelastic coupling between separation and mechanical vibrations.

The dual bell concept and the polygonal concept have the advantage of being structurally simple because they require no additional mechanical or moving parts. A drawback of these nozzle designs, however, is the great length of such nozzle structures. Depending on certain configurations of the corresponding missile or spacecraft, this may lead to conflicts with the allowable mounting dimensions. Furthermore, if the structural area is large, the great overall length is sensitive to pressure pulsations (buffeting), which are caused by the external flow and which can cause high lateral mechanical loads on the shell or on the inner wall of the nozzle in the region of the separated flow.

A means to realize high area ratios at high altitudes, particularly in a vacuum, are the so-called extendible nozzles. The nozzle contour as a rule consists of two parts: the lower downstream part is extended or deployed at high altitude and is coupled to the end of the upper part. Such extendible nozzles are described for example in U.S. Pat. No. 4,947,644, U.S. Pat. No. 4,383,407 and in J. E. Beck and M. D. Horn, "Altitude Compensating Nozzles," Rockwell Threshold, Summer 1995, pp. 38 to 44. Specifically, U.S. Pat. No. 4,947,644 describes a nozzle structure in which a discontinuous nozzle contour is produced by deploying individual elements. The problem, however, is that when the nozzle contour is extended in this manner, high side loads and heat loads may occur during the extension process on the portion of the nozzle contour that is to be extended or deployed if the nozzle contour gets into the area of the open jet of the engine. This is particularly problematic in the technical concept of U.S. Pat. No. 4,947,644.

Thus, the object of the present invention is to provide a means to improve the adaptation of a rocket engine nozzle to different altitudes while minimizing the loads on the nozzle structure.

In one embodiment of the inventions there is a method for extending a nozzle for a rocket engine, in which at least one second region of the nozzle contour is arranged as an extension of a first region of the nozzle contour. In other words a so-called extendible nozzle is provided. This extension of the first region by the second region occurs at an altitude at which the contour of the open jet of the rocket engine substantially corresponds to the contour of the second region. In this invention, the second region, therefore, does not have just any structure, but a structure that substantially corresponds to the contour of the open jet at the specified altitude. This essentially means that the contour of the second region does not necessarily have to exactly match the contour of the open jet. Rather, interaction effects (e.g., the ejector effect) that occur during the extension of the nozzle if the second region is arranged in the area of the open jet can also be taken into account when the contour is determined. This contour can be defined, e.g., using tests or simulations. Adapting the contour of the at least one second region to the contour of the open jet and carrying out the extension process of the nozzle during that portion of the flight trajectory in which the contour of the at least one second region substantially matches that of the open jet makes it possible to clearly reduce the occurring loads, particularly side loads and heat loads. The extension of the nozzle contour at a defined altitude contributes to the adjustment of the nozzle to the conditions at higher altitudes and thus enables a more effective use of the rocket engine. During the first flight segment from the ground up to the defined altitude, no flow separation occurs in the first region of the nozzle contour, and the rocket engine operates with a relatively low area ratio. After completion of the first flight segment, the nozzle is extended by the at least one second region to operate at a greater area ratio and thus to improve the performance at a higher altitude, possibly in a vacuum.

The special contour of the at least one second region depends on the altitude at which the nozzle is extended. For example, the extension of the first region preferably occurs at an altitude where the ambient pressure is lower than the average nozzle pressure of the propellants being ejected through the nozzle at the end of the first region. The average nozzle pressure is obtained by one-dimensional or two-dimensional averaging of the pressure across the nozzle cross-section of the propellants ejected through the nozzle. This means that the first flight segment is carried out at a slight overexpansion (on the ground) or a slight underexpansion (at the end of the first flight segment), such that the contour of the at least one second region is expanded compared to the first region. In principle, however, it is possible to provide a different contour that corresponds to the conditions at a different altitude.

In principle, the nozzle can be extended by different extension mechanisms, e.g., by folding it out or swinging it out. Preferably, the second region is extended in longitudinal direction of the nozzle, since precisely this makes it possible to guarantee a defined movement of the at least one second region relative to the first region while simultaneously maximizing mechanical stability. Until the end of the extension process, the at least one second region practically does not engage with the area of the open jet. This, in turn, reduces the loads acting on the nozzle.

The present invention further comprises an extendible nozzle for a rocket engine in which the nozzle contour in longitudinal direction of the nozzle has a first region with a first contour and at least one second region with a second contour. The at least one second region is configured to extend the first region while forming a discontinuous nozzle contour.

The contour of the at least one second region is adapted to the contour of the open jet at an altitude at which the ambient pressure is lower than the nozzle pressure of the propellants being ejected through the nozzle. The at least one second region is configured to be extendible in longitudinal direction of the nozzle. Conventional mechanisms, e.g., those disclosed in U.S. Pat. No. 4,383,407, can be used as the extension mechanisms.

Other objects, advantages and novel features of the present invention will become apparent from the following detailed description of the invention when considered in conjunction with the accompanying drawings.

DETAILED DESCRIPTION

The concept of an extendible nozzle for a rocket engine in which the nozzle has a first fixed contour region and a second extendible contour region will now be described. Such a concept is applicable, in particular, for use in a lower stage engine of a spacecraft, such as a booster rocket. In principle, the engine could be shut off during the extension process, but this would require restarting the engine, which is connected with an increased risk of failure, and would necessitate an increased development and qualification effort. In addition, there would be a coasting phase of the booster, which could cause a non-optimized flight trajectory. It is therefore desirable to extend the second contour region of the nozzle while the engine is operating. Critical during the extension process is especially the interaction between the open jet of the engine and the extendible nozzle. Particularly important in the context of the extension process are the mechanical and thermal loads during contact of the open jet with the wall of the second region. Until now, these loads could be absorbed only by a complex design of the entire engine, which undesirably increases the weight of the engine.

Figure 1:
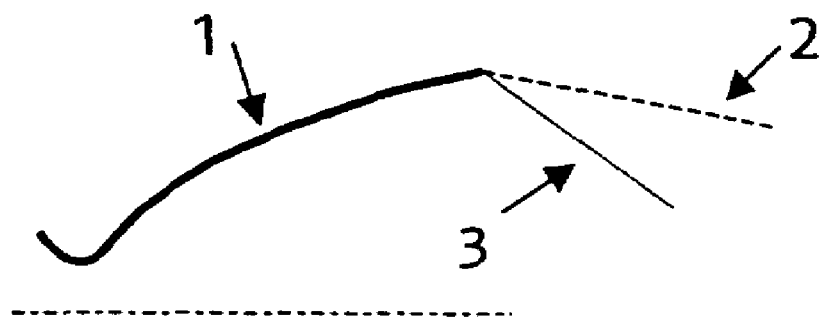
FIG. 1 is a schematic view of a section of the nozzle contour of a rocket engine at low altitudes with overexpansion of the propellants being ejected through the nozzle.
Figure 2:
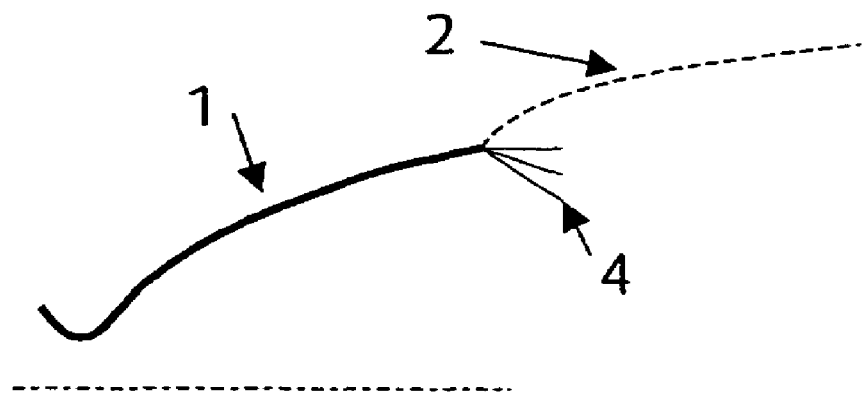
FIG. 2 is a schematic view of the section shown in FIG. 1 but at high altitudes with underexpansion of the propellants being ejected through the nozzle.

FIGS. 1 and 2 schematically illustrate the behavior of the open jet of a rocket engine at different altitudes. The figures each show one half of the first region 1 of the nozzle contour of the rocket engine in cross section. This first region 1 is fixed to the remaining rocket engine and has a bell-shaped contour. Each of the figures further shows the open jet 2, i.e., the boundary of the contour of the open jet of the rocket engine.

FIG. 1 illustrates the ratio at a low altitude H0, e.g., on the ground. Here, overexpansion is present, i.e., the average nozzle pressure $P_{m,e}$ of the propellants ejected through the nozzle in the exit plane at the end of the first region is lower than the ambient pressure $P_a$ $$P_{m,e} < P_a$$

For this reason, the edge of the open jet 2 proceeds within the extension of the contour of the first region 1 of the nozzle contour. The average nozzle pressure results, for example, from a two-dimensional averaging of the nozzle pressure in the exit plane. Furthermore, within the open jet, a pressure adaptation results from a compression shock 3, which is depicted schematically in FIG. 1.

FIG. 2 illustrates the behavior at an altitude H1, for example in the vacuum of space. Here, an underexpansion is present, i.e., $$P_{m,e} > P_a$$

In this case, the pressure adaptation occurs through an expansion of the propellants ejected through the nozzle, i.e., the open jet fans out, which is schematically illustrated as an expansion fan 4. The edge of the open jet now proceeds outside the extension of the contour of the first nozzle region 1.

Figure 3:
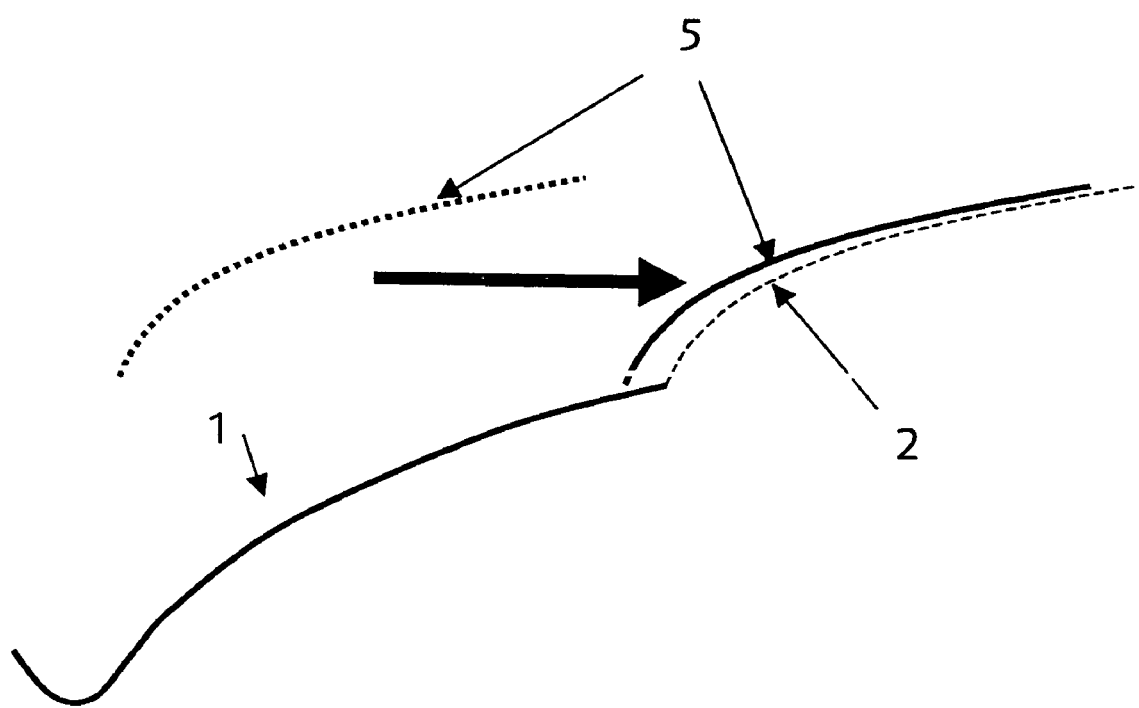
FIG. 3 is a schematic view of the extension of the nozzle according to an embodiment of the invention by extending a second contour region at an altitude with underexpansion.

FIG. 3 shows the deployment of a nozzle extension according to the invention in the form of a second region 5, which in a longitudinal displacement indicated by an arrow is shifted to the end of the first region 1.

If a nozzle extension as depicted in FIG. 3 were to be deployed at an altitude H0, the open jet would contact the wall of the second region 5 as a result of what is called an ejector effect. This would cause high side loads, however, because this contact would be connected with an abrupt expansion of the open jet. An uncontrolled flow separation from the wall of the second region 5 could subsequently also occur, which in turn would lead to correspondingly high loads on the engine. Furthermore, after the extension of the second region at this altitude under constant operational conditions of the engine, additional resistance would initially be produced because the ambient pressure would be higher than the nozzle pressure in the second region 5.

However, the second region 5 that serves to extend the nozzle can produce additional thrust immediately after completion of the extension if this second region 5 is extended at an altitude H1 because in that case it is possible to realize a nozzle contour with a nozzle pressure greater than the ambient pressure. If conventional contouring of the extended nozzle with a continuous curve of the contour at the interface between the first region 1 and the second extendible region 5 were provided, the pressure would drop in the second region and the nozzle contour would by no means correspond to the contour of the edge of the open jet at this altitude H1 at which an extended nozzle can in effect provide additional thrust. In such a case, the open jet must consequently adapt to the contour of the nozzle. During this three-dimensional adaptation process increased side loads occur. Furthermore, the different contours of nozzle and open jet edge cause increased heat loads during the extension process because the nozzle must be extended into the edge area of the open jet.

Thus, the idea of the present invention is to design the contour of the second extendible region 5 in conformity with the contour of the edge of the open jet 2 at the time of the extension, ideally (except for possibly taking into account interaction effects such as the ejector effect) corresponding to the contour of the open jet edge 2 at the corresponding altitude H1 at which the second region 5 is to be extended, as depicted in FIG. 3. With such a contour of the second region 5, the open jet needs to be adapted to the contour only slightly or, ideally, not at all. Because the contour of the second region 5 is very similar to the contour of the open jet 2, only very minor side loads and heat loads occur during the extension process. Slight deviations between the contour of the nozzle and the contour of the open jet 2 may result because of possible adaptations based on the ejector effect during the extension process. The pressure near the open jet is then reduced compared to the actual ambient pressure as soon as the second region 5 interacts with the open jet 2 during the extension process.

In any case, the contour of the nozzle in its extended state, now consisting of the first region 1 and the second region 5, has a sharp bend between the two regions because the contour of the second region 5 is expanded relative to the contour of the first region 1. This results from the fact that the open jet, due to the underexpansion in the first region 1, expands to the corresponding ambient pressure prior to the extension of the second region. As a consequence, the contour of the second region 5—if one neglects the above-described ejector effect—is approximately the contour of a line with constant pressure, which after completion of the extension then leads to a constant wall pressure along the wall of the second region 5. Such a contour can be generated, for example, using the method of characteristics, which is known per se. The wall pressure results from an optimization of the launching trajectory.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for extending a nozzle for a rocket engine, comprising the steps of:

providing a first nozzle portion attached to the rocket engine;

providing a second nozzle portion, wherein the contour of second nozzle portion is arranged to be an extension of the first nozzle portion and to conform to a contour of an open jet from the first nozzle portion at a deployment altitude at which the ambient pressure is lower than an average propellant pressure at an exit end of the first nozzle portion;

maintaining the second nozzle portion in a stowed position during a first period of rocket engine operation; and extending the second nozzle portion to a deployed position, wherein an inlet end of the second nozzle portion is aligned with the exit end of the first nozzle portion to form a single extended nozzle, when the deployment altitude is reached.

2. The method of claim 1, wherein the step of extending the second nozzle portion from the stowed position is accomplished by at least one of longitudinal displacement, pivoting, and unfolding of the second nozzle portion.

3. The method of claim 1, wherein the second nozzle portion is formed by a plurality of nozzle sections, and during the extending step, the nozzle sections extend from stowed positions to deployed positions without passing through the open jet.

4. An extendible nozzle for a rocket engine, comprising:

a first nozzle portion attached to the rocket engine; and a second nozzle portion, wherein the contour of second nozzle portion is arranged to be an extension of the first nozzle portion and to conform to a contour of an open jet from the first nozzle portion at a deployment altitude at which the ambient pressure is lower than an average propellant pressure at an exit end of the first nozzle portion, wherein the second nozzle portion is extended from a stowed position to a deployed position, wherein an inlet end of the second nozzle portion is aligned with the exit end of the first nozzle portion to form a single extended nozzle, when the deployment altitude is reached.

5. The extendable nozzle of claim 4, wherein the second nozzle portion is adapted to be extended from the stowed position to the deployed position by at least one of longitudinal displacement, pivoting, and unfolding.

6. The extendible nozzle of claim 5, wherein the second nozzle portion is formed by a plurality of nozzle sections, wherein the nozzle sections are adapted to be extended from stowed positions to deployed positions without passing through the open jet.

* * * * *